United States Patent [19] [11] 3,922,125
Christensen [45] Nov. 25, 1975

[54] APPARATUS FOR FORMING CONTINUOUS LENGTHS OF CONSTRUCTION ELEMENTS

[76] Inventor: Børge Christensen, Sortemosen, 2690 Karlslunde, Denmark

[22] Filed: Apr. 4, 1973

[21] Appl. No.: 347,914

Related U.S. Application Data

[63] Continuation of Ser. No. 100,672, Dec. 22, 1970, abandoned.

[30] Foreign Application Priority Data
Dec. 23, 1969 Denmark............................ 6859/69

[52] U.S. Cl. .................... 425/64; 425/115; 425/329
[51] Int. Cl.² ......................................... B29D 27/04
[58] Field of Search ............................... 425/63–65, 425/59, 115, 329, 371, 101, 174, 314; 249/85, 97; 264/33–35, 82, 47

[56] References Cited
UNITED STATES PATENTS

| | | | |
|---|---|---|---|
| 1,600,696 | 9/1926 | Murray | 425/59 |
| 2,937,429 | 5/1960 | Livingston | 425/59 |
| 3,178,768 | 4/1965 | Edberg | 425/329 |
| 3,195,208 | 7/1965 | Winn, Jr. | 425/63 |
| 3,214,793 | 11/1965 | Vidal | 425/329 |
| 3,279,936 | 10/1966 | Forestek | 425/DIG. 55 |
| 3,312,760 | 4/1967 | Berner | 425/329 |
| 3,336,631 | 8/1967 | Smith, jr. | 264/47 |
| 3,336,632 | 8/1967 | Smith, Jr. | 264/47 |
| 3,423,492 | 1/1969 | Jonell et al. | 425/63 |
| 3,423,794 | 1/1969 | Wilson | 425/174.2 |
| 3,443,276 | 5/1969 | Smith et al. | 425/115 |
| 3,497,579 | 2/1970 | Barron | 425/63 |

FOREIGN PATENTS OR APPLICATIONS
589,892     1957    Italy...................................... 425/63

Primary Examiner—Robert D. Baldwin
Assistant Examiner—John McQuade
Attorney, Agent, or Firm—Haseltine, Lake & Waters

[57] ABSTRACT

The invention relates to an apparatus for manufacturing shell-formed construction elements and buildings. The apparatus enables the continuous feeding of curable high-viscosity building materials to a stationary or movable point where the material is then moulded so as to form a continuous length of material. While moulding the length of material, there are provided insulating cavities therein, the cavities being arranged more densely spaced near the center portion of the mould and less densely near the sides.

7 Claims, 3 Drawing Figures

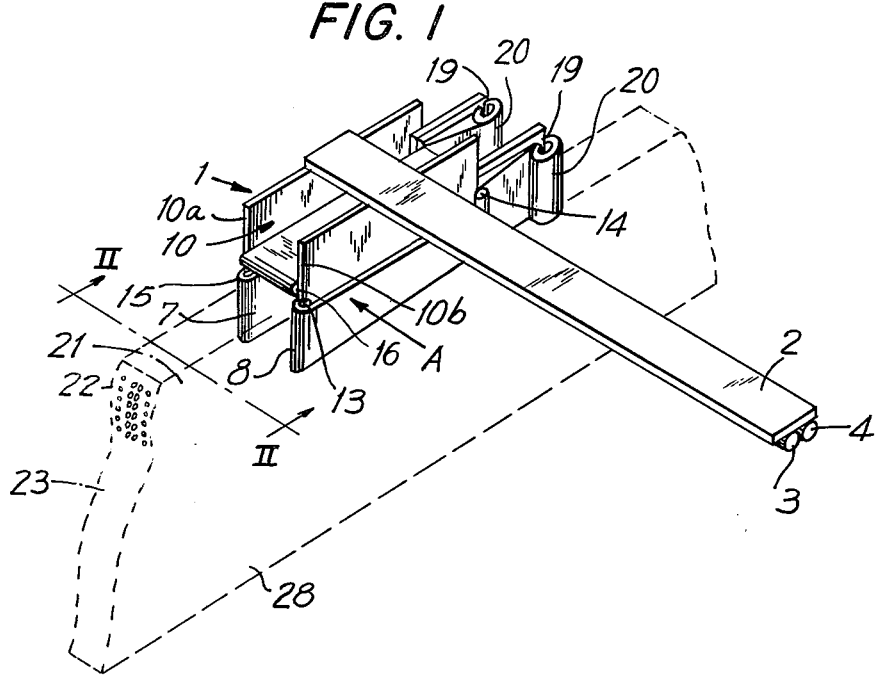
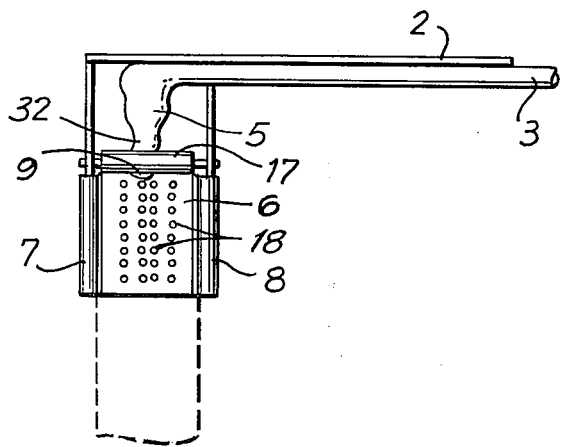
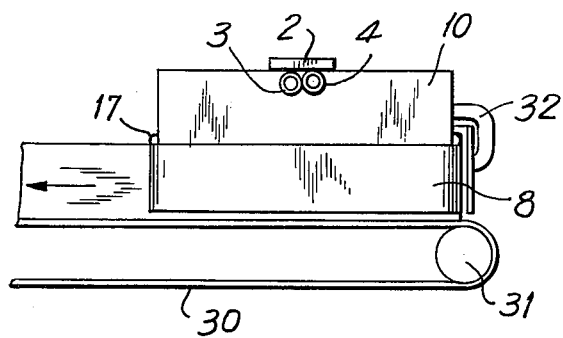

APPARATUS FOR FORMING CONTINUOUS LENGTHS OF CONSTRUCTION ELEMENTS

This application is a continuation of application Ser. No. 100,672; filed Dec. 22, 1970 now abandoned.

The invention relates to an apparatus for manufacturing shell-formed construction elements or buildings of curable high-viscosity building materials, the said apparatus enabling continuous feeding of the building material to a stationary or movable point of manufacture where the material is moulded into a string or continuous length lying, for example on top of or adjacent already laid hardened strings or lengths of material.

There is a known method of this kind which is relatively cheap since it requires but a small number of operators and no heavy foundations such as conventional brick-walled buildings do. The method consists in laying successive lengths of building material on top of or beside each other by means of a movable mould, and since each length adheres to the length lying beneath or beside it and hardens shortly after being laid, the result obtained will be a building or a construction element. The mould is attached to the jib of a suitable jib crane and is fed with a pasty building material through a piping provided in the crane, and the movements of the mould are controlled by a programme control unit at the base of the crane. The pasty material may be a material that is caused to foam or froth before it is fed into the mould and it may, for example, consist of two components, one of which consists of 35 % epoxy resin and 65 % talc or another mineral filler, whereas the other component is a vesiculating or hardening agent. The two components are fed to the mould, each of them separately, and are united directly before the mould so that the length formed by the mould becomes froth-like in consistency. The cavities formed will be of the nature of bubbles and be distributed uniformly throughout the cross-section of the string, which is not very convenient since it is of particular interest to save material in the central zone of the string, that is the zone in which the stresses of the material are usually lowest, anyway if the element is subjected to bending stresses.

It is the object of the invention to devise an apparatus of the aforesaid kind making it possible to manufacture walls or construction elements capable of resisting relatively heavy stresses and nevertheless are of light weight and which furthermore offer a substantial insulation against sound, heat and moisture.

An essential feature of the apparatus according to the invention is that the pasty material, while being moulded into a string, is provided with insulating cavities of a specific pattern. As a result, the finished product may be wholly adapted to the outer stresses to which the product is to be subjected. Further, the cavities formed will make it possible to reduce the penetration of heat, moisture and sound to a low suitable level.

According to the invention the cavities may be arranged in parallel during the moulding operation. As a result, the production of the cavities will be highly facilitated.

Further according to the invention the pasty material may be vibrated while the cavities are being produced, preferably by sound, more particularly ultrasound, which will ensure effectively that no undesired oversize cavities are formed outside the regular cavities.

During the formation of the cavities heat may according to the invention be transmitted to the pasty material, preferably by induction heating. Such a heating is of advantage because the hardening of the string portion just laid may then be faster and more precise.

Further, according to the invention, the pasty material may, provided the volume of the cavities constitutes a relatively large portion of the volume of the material lengths, be applied to reinforcing and/or insulating parts, preferably in the form of bands of aluminium, steel or glass fibres so as to form a "sandwich" or laminate. As a result, the finished product will be of very substantial strength, while the risk of moisture penetration thereof is simultaneously eliminated.

The invention is, as mentioned, also concerned with an apparatus for carrying the inventive method into effect. The apparatus comprises a suitable building crane with a movabale jib, the latter of which includes pipings for feeding a pasty curable building material to a movable mould mounted on the jib. The mould includes further a supporting part that is stationary in relation to the jib. An essential feature of the aforesaid apparatus is that opposite the front end of the bands the supporting part is provided with a transverse front plate which carries a number of cavity-forming rods, wires or pipes. As a result, the finished product may in very simple manner, be formed with such cavities which have a definite location relative to each other. Simultaneously with the pasty material being fed into the mould between the endless bands, the mould is advanced, usually in horizontal direction, and as a result the material will be deposited around the wires, or the thin pipes, and harden. When the hardening has proceeded to the extent whereby the cavities formed cannot collapse, the wires or the thin pipes will already have been withdrawn therefrom. The manufacture of the length of material is continuous, the mould being, during the process of manufacture, advanced very slowly in conformance with the speed of the endless bands.

According to the invention, the wires or the thin pipes may be arranged in parallel, projecting at right angles from that side of the front plate which is facing rearwards. As a result, the cavities produced will be of adequately small size and adequately densely located.

According to the invention the wires or the thin pipes may be of polytetrafluoroethylene, commercially known as Teflon (registered trade mark), or nylon, and be distributed rather densely spaced near the centre portion of the mould, but less densely near the endless bands. As a result, the wires or the thin pipes may be readily released from the building material.

Further, according to the invention, the wires or the thin pipes may be of a length at least equal to that of the endless bands in the mould. As a result, the wires or the thin pipes do not leave the cavity portions formed until the material has been adequately hardened.

According to the invention, the thin pipes may communicate with a suitable pipe system for feeding a gas which may be introduced into the cavities being formed.

According to the invention, the supporting part may also be of substantially H-shaped cross-section and the endless bands may extend around the lower vertical branch portion of the H and around its horizontal bar, whereas the front plate may have a hole through which the pasty material may be introduced into the mould. As a result, the mould may be conveniently conveyed over the parts of previously cast material.

According to the invention, means for induction heating may be mounted on the outer vertical flanges of the supporting part in a zone near the rear end of the mould. As a result, a very effective heating of the rear end of the mould is obtained in simple manner. Heating here will accelerate the hardening of the material very substantially.

According to the invention vibratory means, for example ultrasonic means, may also be mounted on the supporting part. As a result, the material will be caused to deposit in intimate contact with the wires or the thin pipes and the risk of irregular cavities arising will be reduced.

In addition, the supporting part according to the invention may have means for retaining a storage supply of reinforcing or insulating material in the form of bands so that bands may be passed in between the endless bands and the pasty material just deposited so as to form a lamination. As a result, the building or the construction element produced may be supported somewhat and the risk of moisture penetration be completely eliminated.

An essential feature of an embodiment of the apparatus that is very suitable for the manufacture of construction elements is that the supporting part is stationary and that behind it and beneath it there is provided a conveyor for removing the pasty material after its hardening, and a cutting member for cutting the material into suitable lengths. As a result, the construction element may readily be manufactured at an industrial plant, since the apparatus is stationary. As described above, reinforcing bands may be arranged on the cast material, by which the finished construction elements get the character of "sandwich" elements.

The invention will now be described with reference to the drawing, in which:

FIG. 1 shows an embodiment of the apparatus according to the invention while a "wall" or a construction element is being built, FIG. 2 is a section of same taken on the line II—II of FIG. 1 facing upstream into the feed direction of the apparatus, which shows the location of the wires or the thin pipes, and FIG. 3 another embodiment of the apparatus according to the invention, the said apparatus being stationary and very suitable for industrial manufacture of construction elements.

The apparatus shown in FIG. 1, marked as a whole by 1, consists of a crane (not shown) with a jib 2, on the under side of which there are pipings 3 and 4 for feeding a pasty building material to a mould 10 placed at the end of the jib. As will be seen from FIG. 2, the pipe 3 opens into a mixing chamber 5, from which the material runs through a hole 9 provided in a front plate 6 into the mould; the said front plate is located just to the right of the vertical endless bands 7 and 8 of the mould, though it is not visible in FIG. 1. The mould consists of a supporting part of H-formed cross-section, around the lower vertical flanges the bands 7 and 8 are passed, running over rollers 13, 14 and 15 and a roller not visible. The upper vertical flanges 10a and 10b of the supporting part are uncovered and attached to the jib 2. An endless band 17 is passed around the horizontal section of the supporting part. The said band runs over two rollers, of which one 16 is visible, whereas the other one cannot be seen in FIG. 1. The bands 7, 8 and 17 are of glass fibre material laminated with Teflon. To the front plate 6 are attached a number of parallel wires or thin pipes 18, of which only a few are provided with reference numerals (FIG. 2). The wires or thin pipes extend parallel to the endless bands and are of a length substantially conforming to the length of the supporting part. At the righthand end of the supporting part are provided holders 19 for reinforcing material 20 which is available in band form. The bands may, for example, be of aluminium, steel or glass fibres and are adapted to be passed in between the endless bands so as to serve as reinforcement of the sides of the building structure or the construction element. In FIG. 1, the band 21 is shown in its attached condition.

The supporting part may at its trailing end, that is, in the region of zone A which is the portion of the apparatus downstream or to the left of jib 2, be provided with heating means, for example, means for induction heating. As a result, hardening of the pasty material which is injected into the mould may be accelerated. The supporting part may further be provided with vibratory means (not shown) to ensure that the pasty material is brought into efficient and intimate contact around the wires of the thin tubes 18.

The apparatus operates in the following manner:

Epoxy resin and a vesiculating agent are fed each through their separate pipe 3 and 4 to the mixing chamber 5, in which the resin foams, after which it flows through the hole 9 into the mould, depositing around the wires and the pipes 18. The endless bands 7, 8 and 17 contribute to form the resin so as to produce a length 22 (FIG. 1). The contours of the length are similarly as the contour of the building structure indicated by dotted lines in order not to veil the essentials of the Figure. The epoxy resin, which at the moment it is injected into the mould, is of a pasty consistency will quickly move down between the wires or the pipes 18 and fill out the whole cavity of the mould, vibrations being imparted by the supporting part. Since the bands are rotated very slowly by driving means (not shown), the rear end of the mould will soon arrive in a position opposite the resin injected, and the resin will quickly be hardened by the heat from the heating means in the zone A so that it becomes capable of supporting itself. The length of material 22 placed on top of the length of material 23 and adhering very efficiently to same is provided with longitudinal holes produced by the wires or pipes 18, and the holes are located most densely at the center portion of the length section 22. For the sake of clarity FIGS. 1 and 2 show but very few holes; in fact, there may be eight to ten times as many holes. Between the resin and the bands 7 and 8 are located reinforcing bands 20 which will adhere very efficiently to the resin, resting in intimate contact with same as indicated at 21.

If the front plate 6 is provided with thin pipes 18, these may communicate with a pipe system for a gas which may be supplied to and fill out the parallel, channel-formed cavities formed in the string of material 22.

The movement of the jib 2 in relation to the structure 28 is regulated by means of a program control unit. The said unit also regulates the supply of resin to the mould.

FIG. 3 shows an embodiment of the apparatus according to the invention in which the mould 10 is stationary in relation to its surroundings and in which an endless band conveyor 30 is mounted at the underside of the mould. The said band runs over a roller 31 and another roller (not shown). The resin and the vesiculating agent are in that case also introduced through pipes 3 and 4 and passed from the mixing chamber through a pipe 32 into the mould through the hole 9. For the sake of clarity the reinforcing bands in their holders are omitted in the Figure. When the resin has been injected into the mould, the vertical endless bands 7 and 8 and the horizontal endless band 17 as well as the conveyor 30 will pass the resin to the left as it is hardening. Preferably, the cavity of the mould has a height corresponding to the height of the finished construction element. The hardened string of material is cut into sections of suitable length when leaving the mould.

Instead of epoxy resin to which a filler has been added use may be made of other material, for example cement, polyurethane and polyester containing a filler.

By means of the apparatus according to the invention structures having both the necessary carrying capacity and insulating capacity may be manufactured in one operation, which is of substantial advantage since it means an essential economy in manpower.

The embodiments of the apparatus according to the invention served only as illustrations and are not limiting the scope of protection.

I claim:

1. In an apparatus for continuously manufacturing shell-formed elongate, continuous construction elements, buildings or the like, of curable high-viscosity building materials, said apparatus being longitudinally movable relative to said elements and comprising; a jib; a mold being mounted on said jib; piping on said jib for continuously feeding said curable high-viscosity building material to said mold; said mold including a supporting element rigidly fixed relative to said jib; endless movable belts defining wall portions of said mold being supported on said supporting element; a generally vertical plate extending transversely of the relative motion between said elements and said mold being located on a front end of said supporting element; and cavity forming means for said elements in said plate, the improvement comprising: said supporting element being substantially H-shaped in crosssection, said endless belts having portions extending around the lower vertical projecting parts of the H-shape and around its horizontal bar, said plate having a hole for introducing the building material into said mold from said piping on said jib, said cavity forming means including a plurality of parallel short wires of small cross-section, said wires being fastened to said plate so as to project into said mold in a direction coextensive with the longitudinal path of relative movement between said elements and said apparatus, said wires being positioned in closely spaced relationship in the center portion of the mold and at increasingly larger material distances toward the edges of said mold; and means connected to said supporting element for continuously feeding reinforcing and insulating bands into the space between said belts and the material being fed into said mold whereby the bands are continuously laminated to the surfaces of the building material.

2. An apparatus as claimed in claim 1, said wires being arranged to project at right angles to a rearwardly facing surface of said plate.

3. An apparatus as claimed in claim 1, said wires being essentially constituted of polytetrafluoroethylene.

4. An apparatus as claimed in claim 1, said wires being essentially constituted of nylon.

5. An apparatus as claimed in claim 1, said wires being of a length at least equal to the length of the mold in the longitudinal direction thereof.

6. An apparatus as claimed in claim 1, said wires each being hollow so as to form thin-walled pipes adapted to convey a gaseous medium into said mold.

7. An apparatus as claimed in claim 1, comprising a movable conveyor located beneath said mold for removing the formed building element subsequent to hardening thereof.

* * * * *